United States Patent Office 3,039,874
Patented June 19, 1962

3,039,874
COMPOSITIONS FOR THE NUTRITION
OF ANIMALS
Charles Romeo Marcel Schuppon, Nanterre, France, assignor to Societe des Usines Chimiques Rhone-Poulenc, Paris, France, a French body corporate
No Drawing. Filed Apr. 1, 1960, Ser. No. 19,152
Claims priority, application France Apr. 4, 1959
6 Claims. (Cl. 99—2)

The present invention relates to compositions for the nutrition of animals and more particularly to compositions for the improvement of the general condition of animals and for speeding up growth.

It is known that various favourable effects, for example, on the rate of growth and on the state of health may be obtained by the addition of certain products in the diet of animals. Such products are present, for example, in the meat and fish meals used as additional elements of animal food. It has also been found that certain synthetic products, antibiotics such as penicillin and chlortetracycline or vitamins such as vitamin $B_{12}$, added to the rations of animals such as chickens, turkeys, calves and pigs produce in varying degrees these favourable effects on the development of the animal.

It is also known that the antibiotic substances produced by the culture of *Streptomyces ambofaciens*, and designated Spiramycins I, II, and III, as well as mixtures of these Spiramycins possess interesting antibacterial properties which make them therapeutically useful. It is known also that Spiramycins I, II and III have closely related chemical constitutions and have similar effect on a given micro-organism.

It has now been found that Spiramycins I, II and III and also mixtures of Spiramycins I, II and III have important anabolic properties and that, when added to the food of animals, individually or mixed, they cause much more rapid increase in weight than has been noted with entirely natural foods or those containing previously known factors.

The gain in weight thus recorded with feeds based on Spiramycins corresponds to a real formation of tissue and not to an increase in the reserves of water in the organism. Another advantage of the compositions of the invention lies in the fact that they do not cause any undesirable secondary effects on the animals. Finally, the treated animals remain in good health and mortality is lower than among control animals receiving entirely natural food.

The compositions according to the invention may be used in the nutrition of all livestock but it is particularly on the pig that they are most efficacious.

The Spiramycins may be added to products for animal nutrition in various forms: as pure substances, or as crude products obtained from fermentation broths after adsorption by an adsorbent medium, such as adsorbent earths, or after evaporation to dryness.

The quantities of Spiramycin to be added to the rations may naturally vary within fairly large limits according to the species of animal and according to the value of the foods themselves. As a general rule doses of 10 to 50 grammes per tonne of food are suitable.

The following examples illustrate the invention and show how it may be put into practice.

Example I

A basic food containing 13% crude protein was given to 2 homogeneous groups of 8 pigs each (breed: Large White-Danish cross) commencing after weaning. Spiramycin was incorporated in a homogeneous fashion at the rate of 16 g. per tonne of food in the food intended for one of the groups of pigs. The conditions and results of the test are summarised in the following table:

|  | Control Group | Group which received Spiramycin |
|---|---|---|
| Number of individuals | 8 | 8 |
| Average weight per individual in kgs.: | | |
| at start of the test | 18.5 | 20.5 |
| 29 days later | 26.4 | 30 |
| Average percentage increase in weight per individual in kgs | 7.9 | 9.5 |
| Average daily increase per individual in grammes | 273 | 328 |
| Increase of the rate of growth compared with the control, percent |  | 20.2 |
| Consumption of food in kg. per group | 218 | 232 |
| Feed conversion (quantity of food consumed to produce 1 kg. live weight) | 3.46 | 3.06 |
| Saving of food compared with the control, percent |  | 11.6 |

This experiment shows that the addition of Spiramycin to the basic food accelerates the growth of the animals and increases the yield in live weight produced for the food consumed.

Example II

Another experiment was made with two groups of 5 pigs each, receiving the same basic food as in Example I. Spiramycin (20 g. per tonne of food) was incorporated in a homogeneous fashion in the food of one of the groups of pigs. The test carried out as in Example I with individuals of about 20 kg. was continued for a longer time. At the end of the test the average increase in weight was 40 kg. The average gains and indices of consumption were as follows:

|  | Control Group | Treated Group |
|---|---|---|
| Average daily gain in grammes per individual | 353 | 492 |
| Increase in rate of growth compared with the control, percent |  | 39.4 |
| Feed conversion | 4.43 | 3.53 |
| Saving of food compared with the control, percent |  | 21.2 |

Example III

Three groups of 50 chicks each (Sussex breed) were fed from one day old for 83 days with the same basic food, one group being used as a control, while Spiramycin was uniformly incorporated in the food of the other two groups at the rate of 10 g. per tonne of food for one group and 25 g. per tonne for the other. The results obtained were as follows:

|  | Control Group | Groups treated with Spiramycin | |
|---|---|---|---|
|  |  | 10 g./tonne | 25 g./tonne |
| Average weight per individual in g.: |  |  |  |
| at one day | 36.5 | 36.5 | 36.5 |
| at slaughter | 1,104 | 1,197 | 1,233 |
| Increase compared with the control, percent |  | 8.4 | 12.1 |
| Feed conversions were respectively | 3.7 | 3.8 | 3.6 |

Example IV

Two groups of 11 heifers each aged about one year and weighing about 200 kg. were raised on pasture, but the heifers of one group received each day, in addition, Spiramycin (100 mg.) orally. The results were as follows:

|  | Control group, kilograms | Treated group, kilograms |
|---|---|---|
| Initial weight of group | 2,190 | 2,084 |
| After 12 weeks | 2,284 | 2,277 |
| Gain in 12 weeks: |  |  |
| Per group | 94 | 193 |
| Per individual | 8.540 | 17.540 |

By comparison with their weights at the start of the test, the animals weigh 12 weeks after, respectively, 104.3% and 109.3% of their initial weights; this represents a gain of $$\frac{5 \times 100}{104.3}$$

i.e. 4.8% for the treated group.

Example V

Two groups of weaned Duroc piglets each weighing 15–16 kg. are selected so that the average weight per piglet is 15.8 kg. in each group. The animals are fed on a basic ration containing 16% crude proteins until they weigh 50 kg. and then on a basic ration containing 14% crude proteins. Spiramycin at a rate of 20 g./tonne is added to the rations of one of the groups. The results obtained are as follows:

|  | Control group | Group receiving Spiramycin |
|---|---|---|
| Average weight per animal at commencement, kg. | 15.8 | 15.8 |
| Average weight per animal after 98 days, kg. | 69.4 | 84.4 |
| Average gain per animal, kg. | 53.6 | 68.6 |
| Average daily gain, g. | 547 | 700 |
| Increase in rates of growth,[1] percent |  | 28 |
| Feed conversion | 3.26 | 3.27 |
| Saving in food [1] |  | 0 |

[1] Expressed as a percentage compared with the control.

Example VI 256 pigs are divided into groups of 8 with 8 groups per dosage rate, giving a total of 64 pigs per dosage rate. The groups are selected in such a way that in each series of treatments the groups receiving the different treatments can be compared. The basic ration contains 18% crude proteins. The results obtained are as follows:

|  | Control, zero | Spiramycin | | |
|---|---|---|---|---|
|  |  | 12.5 g./tonne | 25 g./tonne | 50 g./tonne |
| Average daily gain per individual: |  |  |  |  |
| during the first 15 days, g. | 181 | 213 | 222 | 231 |
| during the first 31 days, g. | 263 | 308 | 330 | 349 |
| Increase in speed of growth (percent compared with control): |  |  |  |  |
| during the first 15 days, percent |  | 17.5 | 22.5 | 27.5 |
| during the first 31 days, percent |  | 17.2 | 27.5 | 32.7 |
| Feed conversion: |  |  |  |  |
| at 15 days | 2.14 | 1.83 | 1.93 | 1.93 |
| at 31 days | 1.90 | 1.84 | 1.64 | 1.70 |
| Saving in food (percent compared with control): |  |  |  |  |
| at 15 days, percent |  | 14.5 | 9.8 | 9.3 |
| at 31 days, percent |  | 3.1 | 13.6 | 10.5 |

Example VII

Weaned piglets are reared on a normal diet to a weight of about 80 kg. They are then divided into groups of 5, with 2 groups per dosage rate. The basic ration contains 97% of maize and soya bean and 1% bone meal as well as lime, mineral salts and vitamins.

The results after 11 weeks are as follows:

| Results | Control | | Spiramycin | | | | | |
|---|---|---|---|---|---|---|---|---|
|  |  |  | 10 g./tonne | | 20 g./tonne | | 40 g./tonne | |
| Number of group | 1 | 2 | 1 | 2 | 1 | 2 | 1 | 2 |
| Average weight of subject (kg.) at |  |  |  |  |  |  |  |  |
| commencement | 23.8 | 24.2 | 24.2 | 24.1 | 24.2 | 23.9 | 23.9 | 23.9 |
| 11 weeks after | 76.1 | 77.4 | 84 | 75.8 | 83.1 | 78.4 | 82.9 | 80.8 |
| Total gain in weight per subject (kg.) | 52.3 | 53.2 | 59.8 | 51.7 | 58.9 | 54.5 | 59 | 56.9 |
| Average daily gain (g.) | 679 | 693 | 775 | 678 | 769 | 711 | 709 | 738 |
|  | 686 | | 726 | | 740 | | 753 | |
| Increase in speed of growth,[1] percent |  |  | 5.3 | | 6.6 | | 9.2 | |
| Feed conversion | 3.43 | 3.24 | 3.34 | 3.39 | 3.19 | 3.36 | 3.35 | 3.13 |
|  | 3.34 | | 3.36 | | 3.28 | | 3.24 | |
| Saving in food,[1] percent |  |  | −0.08 | | 1.7 | | 3 | |

[1] Expressed as a percentage compared with control.

Example VIII

The trial, carried out from the age of 1 day to 6 weeks, was on 2 control groups of 20 chickens each and 3 treated groups of 20 chickens each, reared in batteries, each group containing 10 cockerels and 10 pullets. The basic ration contained 70% maize and soya bean, 5% lucerne meal, 4% fish meal, 2.5% powdered skimmed milk, 2% stabilised animal fat, 5% gluten, 7% miscellaneous cereals, 2% bone meal, 1% calcium carbonate, 0.5% sodium chloride, vitamins and trace elements.
Results obtained:

|  | at 3 weeks | | | | at 6 weeks | | | |
|---|---|---|---|---|---|---|---|---|
|  | Average weight in grammes | Percent | F.C. | Percent | Average weight in grammes | Percent | F.C. | Percent |
| Controls | 185 |  | 2.27 |  | 510.5 |  | 2.43 |  |
| with Spiramycin: |  |  |  |  |  |  |  |  |
| 4 g./tonne | 205 | 110.8 | 2.31 | −1.5 | 527.7 | 103.4 | 2.29 | 5.5 |
| 10 g./tonne | 225.2 | 121.5 | 2.06 | 9.5 | 557.6 | 109.3 | 2.43 | 0 |
| 20 g./tonne | 217.2 | 117.2 | 1.95 | 14.5 | 564.3 | 111.6 | 2.25 | 7.2 |

NOTE.—The percentages are given in comparison with the controls, F.C.=Feed Conversion.

*Example IX*

Trials are carried out with Hampshire and Landrace pigs divided into groups of 10 to 14 with 5 groups per dosage rate; in all a total of 59 pigs per dosage rate. In each group the piglets were 5.5 to 5.750 kg. in weight and 28 to 35 days old. They were chosen in such a way that in each series of treatments the groups receiving the different treatments were completely comparable, having the same number of piglets, the same average weight and the same average age.

The trial lasted 28 days in the case of the first series of treatments and for 35 days in the case of the four other series.

The basic ration was composed of 56.5% maize and 21% soya bean, with 2.5% "fish solubles" and 15% skimmed-milk powder as source of animal protein. In addition there were present stabilised fat (2.5%), vitamins, mineral salts and saccharin (0.05%). The ration contained 18% crude protein.

The results were as follows:

|  | Control | Spiramycin | | |
|---|---|---|---|---|
|  |  | 12.5 g./tonne | 25 g./tonne | 50 g./tonne |
| Average weight per subject (kg.): |  |  |  |  |
| at commencement | 5.53 | 5.75 | 5.66 | 5.75 |
| after 15 days | 7.07 | 7.83 | 8.06 | 8.20 |
| after 28 to 35 days | 10.33 | 11.86 | 13.63 | 14.13 |
| Total gain in weight per subject (kg.): |  |  |  |  |
| During the first 15 days | 1.54 | 2.08 | 2.40 | 2.45 |
| Total | 4.8 | 6.11 | 7.97 | 8.38 |
| Increase in growth rate (percent compared with control): |  |  |  |  |
| during first 15 days, percent |  | +35 | +55 | +59 |
| Total, percent |  | +27 | +66 | +74 |
| Feed conversion (or average weight of food (kg.) per kilogramme gain in weight), total | 2.89 | 2.40 | 1.95 | 1.83 |
| Saving in food compared with control, percent |  | 17 | 32 | 36 |
| Death rate, percent | 8.5 | 5.1 | 1.7 | 3.4 |

I claim:

1. A method for accelerating the growth of a domestic animal for the purpose of increasing its economic or commercial value at a given age which comprises feeding to the animal a foodstuff acceptable to the animal and containing a significant proportion of a member of the class consisting of Spiramycin I, II and III and mixtures of at least two of these antibiotics.

2. A method for artificially accelerating the growth of weaned piglets for the purpose of enhancing their saleability at a given age which comprises supplementing the diet of the piglets with a significant proportion of a member of the class consisting of Spiramycin I, II and III and mixtures of at least two of these antibiotics.

3. A method as claimed in claim 1 wherein the total content of the stated antibiotics lies between 10 and 50 grams per metric ton of foodstuff.

4. A method as claimed in claim 2 wherein the total content of the stated antibiotics lies between 10 and 50 grams per metric ton of foodstuff.

5. Animal foodstuff supplemented by a significant proportion of a member of the class consisting of Spiramycin I, II and III and mixtures of at least two of these antibiotics.

6. Animal foodstuffs as claimed in claim 5 wherein the total content of the stated antibiotics lies between 10 and 50 grams per metric ton of foodstuff.

References Cited in the file of this patent

UNITED STATES PATENTS 2,943,023    Ninet _____ June 28, 1960

FOREIGN PATENTS 796,311    Great Britain _____ June 11, 1958

OTHER REFERENCES

Seiden: Handbook of Feedstuffs, 1957, Springer Pub. Co., N.Y.C., pages 25–27.

Jukes: Antibiotics in Nutrition, 1955, Medical Encyclopedia, Inc., N.Y.C., pages 13, 57, 58, 75 and 96.